US008864212B2

(12) United States Patent
Cramaro (10) Patent No.: US 8,864,212 B2
(45) Date of Patent: Oct. 21, 2014

(54) DRIVE UNITS FOR TARPAULIN COVER SYSTEMS

(71) Applicant: Cramaro Tarpaulin Systems, Inc., Melbourne, FL (US)

(72) Inventor: Michael Cramaro, Indian Harbour Beach, FL (US)

(73) Assignee: Cramaro Tarpaulin Systems, Inc., Melbourne, FL (US)

( * ) Notice: Subject to any disclaimer, the term of this patent is extended or adjusted under 35 U.S.C. 154(b) by 0 days.

(21) Appl. No.: 13/753,640

(22) Filed: Jan. 30, 2013

(65) Prior Publication Data
US 2014/0210228 A1    Jul. 31, 2014

(51) Int. Cl.
*B60P 7/04*    (2006.01)
*F16H 19/06*    (2006.01)

(52) U.S. Cl.
CPC .............. *B60P 7/04* (2013.01); *F16H 19/0618* (2013.01)
USPC ................................ 296/100.12; 296/100.11

(58) Field of Classification Search
CPC .............. B60J 7/06; B60J 7/061; B60J 7/062; B62D 39/002; B62D 39/006; B62D 39/007; B61D 39/002; B61D 39/006; B61D 39/007
USPC ......................... 296/104, 105, 100.11, 100.12
See application file for complete search history.

(56) References Cited

U.S. PATENT DOCUMENTS

| | | | |
|---|---|---|---|
| 4,289,346 A * | 9/1981 | Bourgeois .................. | 296/105 |
| 6,435,595 B1 * | 8/2002 | Chenowth ................ | 296/100.13 |
| 7,887,117 B2 | 2/2011 | Pivetta | |
| 2002/0021018 A1 | 2/2002 | Royer | |
| 2009/0121514 A1 * | 5/2009 | Remmel et al. .......... | 296/100.12 |
| 2009/0322116 A1 | 12/2009 | Pivetta | |
| 2010/0109373 A1 * | 5/2010 | Pivetta ..................... | 296/100.11 |

FOREIGN PATENT DOCUMENTS

| | | |
|---|---|---|
| CN | 101396983 | 4/2009 |
| EP | 2075149 A1 | 7/2009 |
| EP | 2311678 A1 | 4/2011 |
| EP | 2371597 A1 | 10/2011 |
| WO | WO-2011/077316 A1 | 6/2011 |

OTHER PUBLICATIONS

International Search Report and Written Opinion for PCT/US2014/013588 dated May 23, 2014.

* cited by examiner

*Primary Examiner* — Dennis H Pedder
(74) *Attorney, Agent, or Firm* — Drinker Biddle & Reath LLP (57) ABSTRACT

Various configurations of drive units for tarpaulin cover systems, particularly for use on vehicle bodies, are disclosed. Exemplary drive units include a gear arrangement configured to attach to an upper perimeter section of an open-top structure and at least one motion initiating device coupled to the gear arrangement. The gear arrangement can include a left spur gear attached to a left cable holder/pulley and a right spur gear attached to a right cable holder/pulley. A motion initiating device is configured to impart a force that initiates rotation of the left spur gear and the right spur gear in opposite directions and movement (i.e. retraction and extension) of a tarpaulin coupled to the gear arrangement. The motion initiating device can be either a crank, which is driven manually, or a motor, which is driven electrically. In other configurations, at least two bevel gears or at least one secondary spur gear are coupled to the motion initiating device.

18 Claims, 9 Drawing Sheets

DRIVE UNITS FOR TARPAULIN COVER SYSTEMS

BACKGROUND

1. Field of the Invention

The field of the present invention relates to drive units for tarpaulin cover systems, particularly for, but not limited to, open-top vehicles (e.g. trucks).

2. Background

Open-top containers or vehicle bodies are often used to transport dry bulk materials, such as ores, coal, cereal, grains, wood chips, sand, gravel and stone. These types of containers or vehicles are much easier to load and unload because the upper portion of the container is open, i.e. not covered. Open-top containers or vehicle bodies provide many benefits, particularly, with respect to loading and unloading of materials. Nonetheless, using open-top containers—without any type of cover—can present several risks.

Most of the risks presented when using open-top containers or vehicle bodies without a cover results from weather and transport-related conditions. Excessive wind, heat, and/or cold can significantly damage loaded materials. Excessive moisture within a container, resulting from rain and snow, can also cause problems for many types of loaded materials (e.g. grain). Transport conditions are known to present problems when loaded materials are not covered. Vibrational and aerodynamic forces may cause portions of material to be carried away, resulting in contamination of railways, roadways, and waterways. Hazardous conditions may also result, especially when heavier loaded materials, such as gravel and stone, are blown or thrown off of open-top containers or vehicle bodies, during rigorous road conditions.

Because of these and other known problems, many open-top containers or vehicle bodies are now provided with tarpaulin cover systems. Tarpaulin cover systems protect loaded materials from exposure to cold, heat, wind, rain and prevent loaded materials from being carried away because of transport conditions. Sometimes tarpaulins cover systems use drive units that retract and extend a tarpaulin over an open-top container. These drive units, therefore, allow a user to manually or automatically cover and uncover loaded materials.

While known drive units are useful for their intended purpose, many have limitations. Some units are very complicated, heavy, and difficult to install. Other drive units are limited in that they can only attach to open-top containers (not limited to vehicles bodies) with two or more container walls. As a result, many drive units are not suitable for use with other types of open-top structures, e.g. beam and truss structures without walls.

For these reasons, among others, there is a clear need for improved tarpaulin cover systems and drive units for tarpaulin cover systems.

SUMMARY

Drive units for a tarpaulin cover system include a gear arrangement configured to attach to an upper perimeter section of an open-top structure and at least one motion initiating device coupled to the gear arrangement. The gear arrangement can include a left spur gear attached to a left cable holder/pulley and a right spur gear attached to a right cable holder/pulley. The motion initiating device is configured to impart a force that initiates rotation of the left spur gear and the right spur gear in opposite directions and movement (i.e. retraction and extension) of a tarpaulin coupled to the gear arrangement. The motion initiating device can be either a crank, which is driven manually or a motor, which is driven electrically. In other drive unit configurations, at least two bevel gears or at least one secondary spur gear are coupled to the motion initiating device.

BRIEF DESCRIPTION OF THE DRAWINGS

The drawings described herein are for illustrative purposes only and are not intended to limit the scope of the present disclosure. In the drawings, wherein like reference numerals refer to similar components.

DETAILED DESCRIPTION

Figure 1:
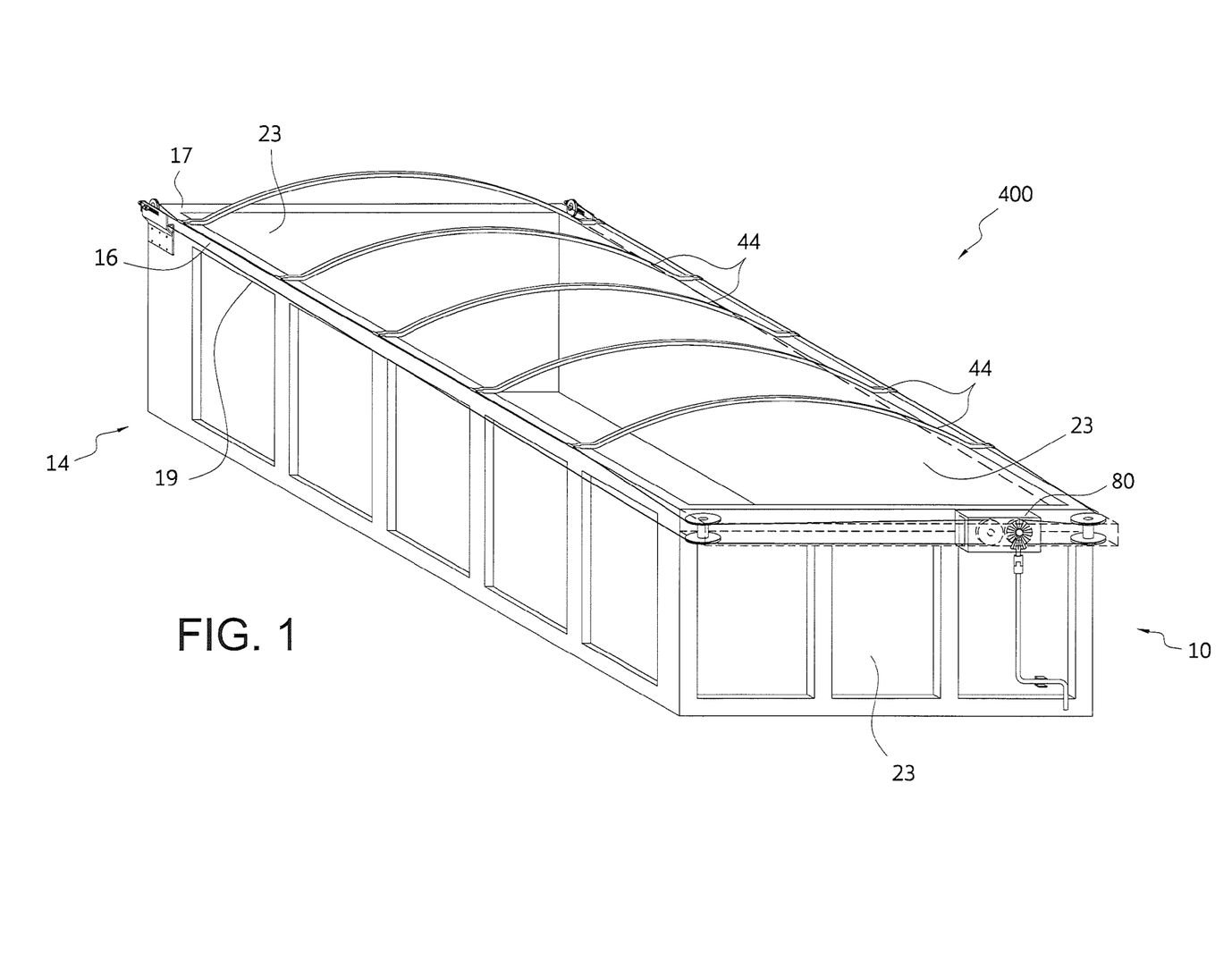
FIG. 1 is a perspective view of an open-top body of a truck, using the tarpaulin cover system of this invention.
Figures 8A, 8B:
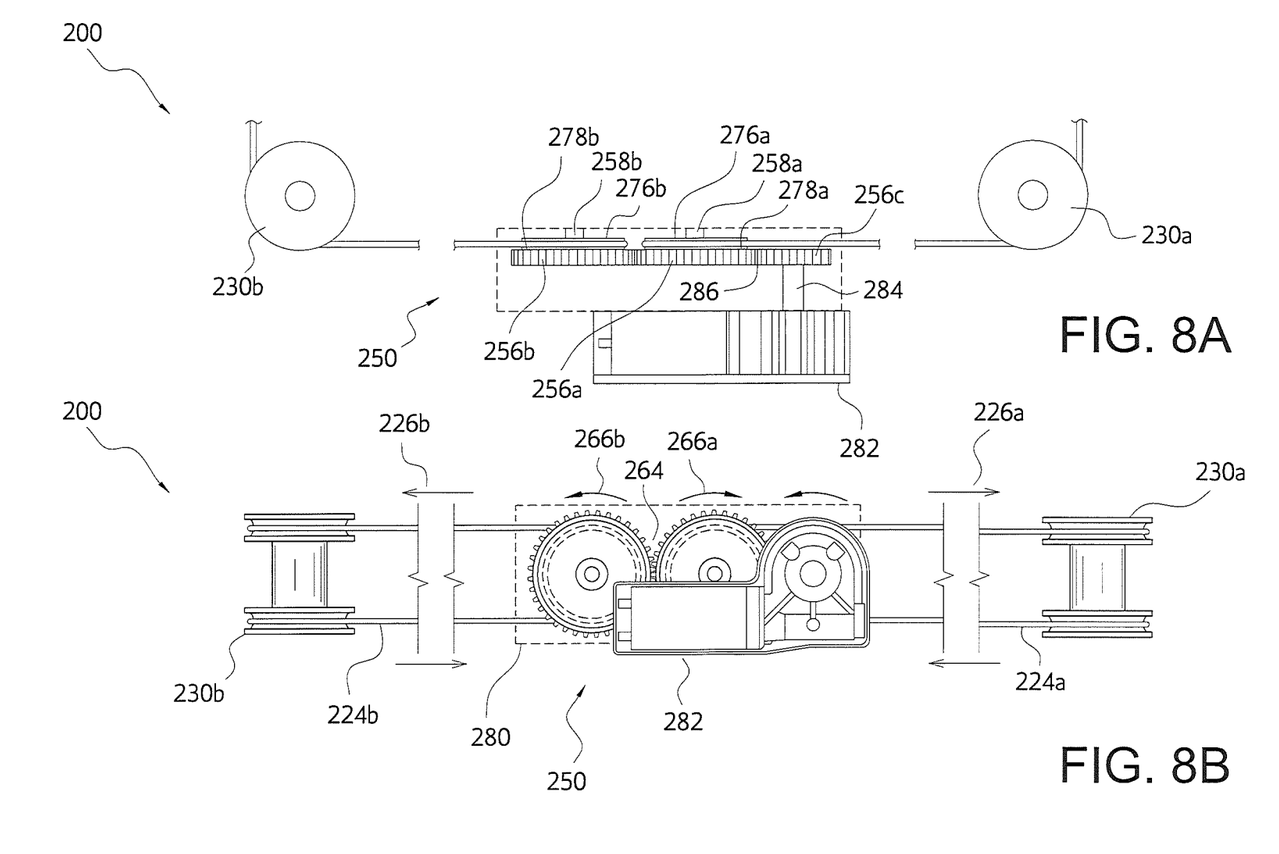
FIG. 8A is a top view of a third drive unit configuration.
FIG. 8B is a front view of the drive unit shown in FIG. 8A.
Figure 9A:
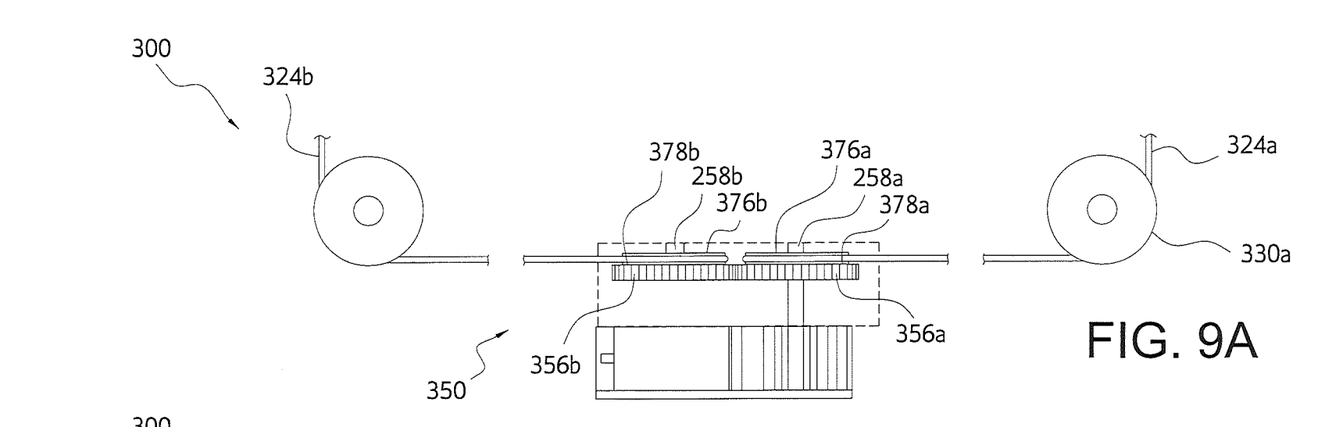
FIG. 9A is a top view of a fourth drive unit configuration.
Figure 9B:
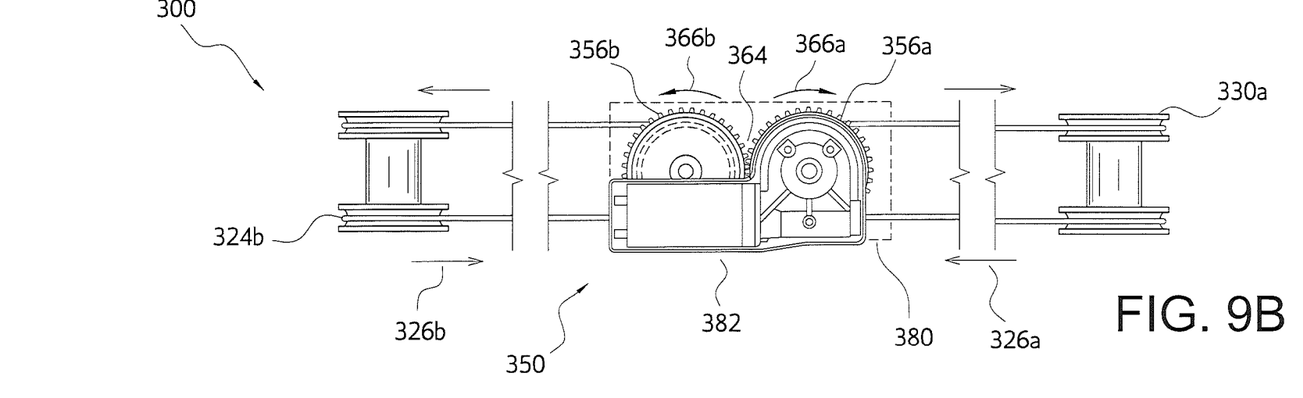
FIG. 9B is a front view of the drive unit shown in FIG. 9A.
Figure 10:
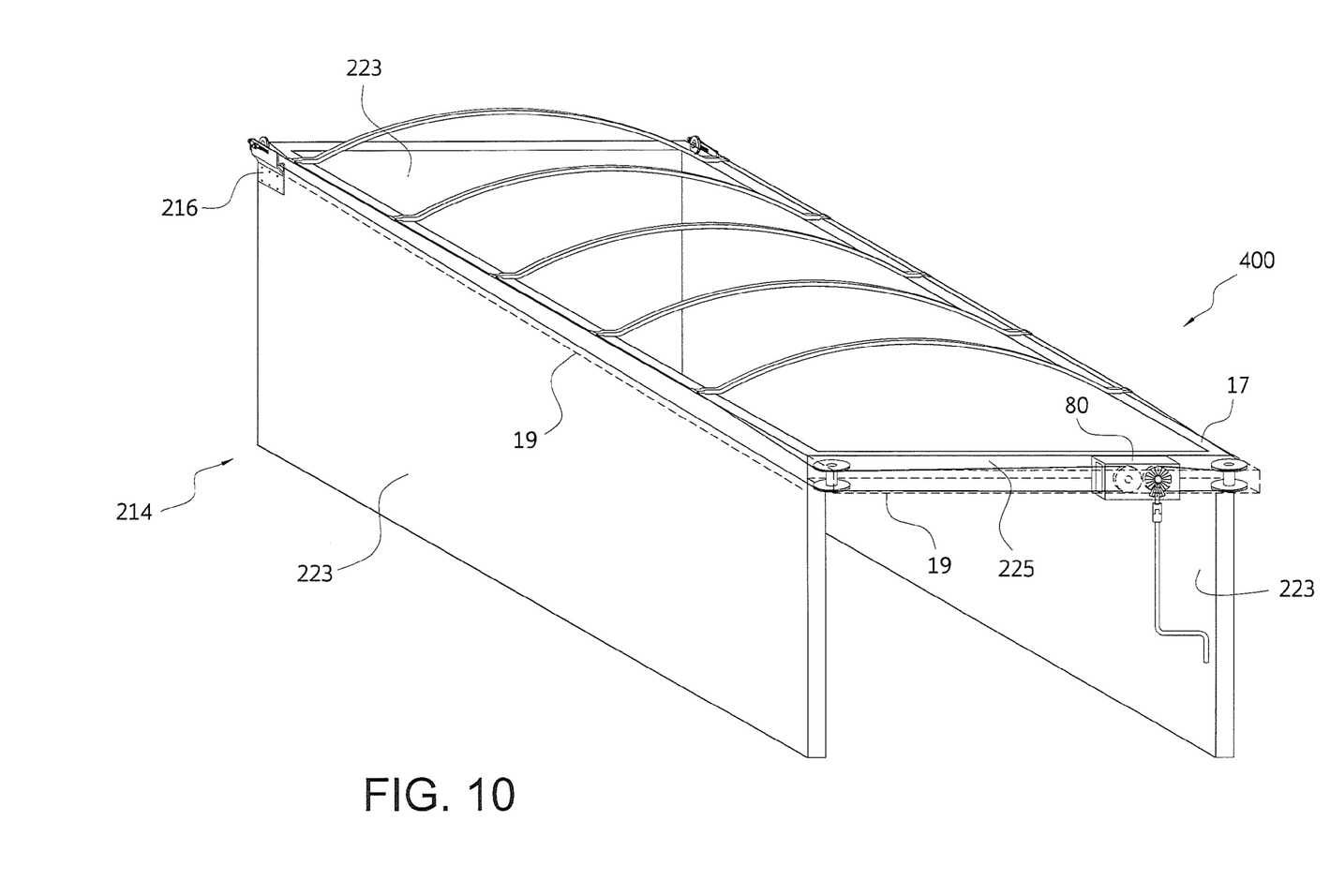
FIG. 10 is a perspective view of a tarpaulin cover system disposed on another type of open-top structure.

FIGS. 1-10 illustrate various configurations of drive units 10, 100, 200, 300 for use in a tarpaulin cover system 400. FIG. 1 illustrates the preferred practice of this invention where the tarpaulin cover system 400 is used to selectively cover and uncover the open-top of a truck body. The cover system may be used with other open-top vehicles or moveable transportation members, including railway cars. FIGS. 6A-6B and FIG. 10 show the cover system 400 used with stationary open-top structures. As illustrated, the open-top structure 14 in FIG. 1 is a truck body, having recessed walls 23 on each of its four sides. The open-top structure 114 of FIGS. 6A-6B is a stationary structure where the perimeter section 116 is supported at each corner by legs 21. The open-top structure 214 of FIG. 10 has three side walls 223, which support the upper perimeter section 216, including front perimeter section 225. A further variation would be a structure similar to structure 214 but having only two side walls and being open at both ends.

Figure 2:
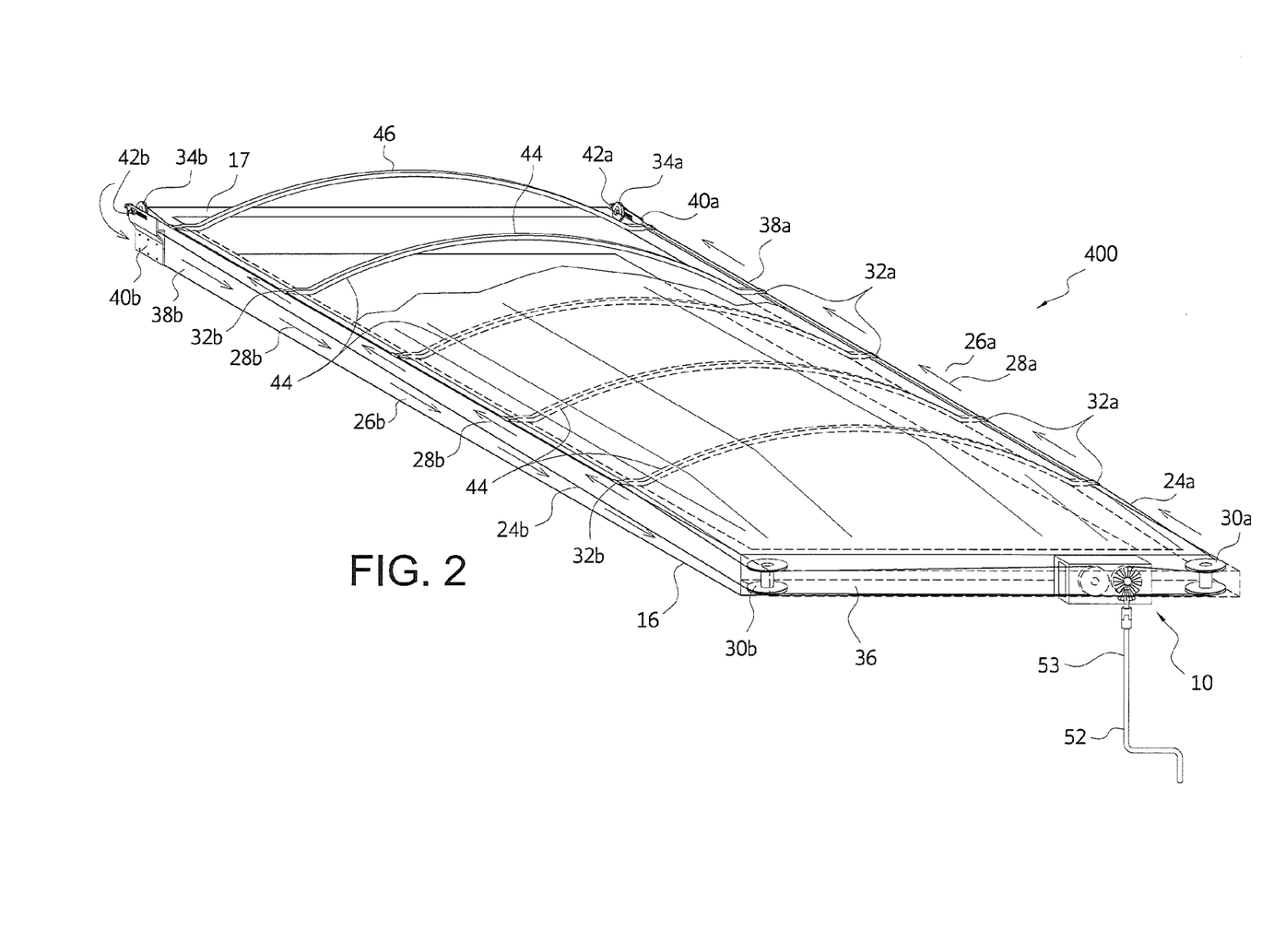
FIG. 2 is a perspective view of a tarpaulin cover system, incorporating a first drive unit configuration, which can be on an open-top structure in accordance with this invention.

Each tarpaulin system includes a drive unit and multiple elements, which are arranged to extend and retract a tarpaulin 12 (FIG. 2) along a length of an open-top structure 14, having an upper perimeter section 16. Therefore, as used herein, an open-top structure 14 is defined as any structure having at least one upper perimeter section 16 and any combination of support walls and/or legs. While vehicle or truck bodies are the preferred structure, other exemplary open-top structures include, but are not limited to, box, beam, and truss structures used in transportation, agriculture, and architecture. FIG. 2 further illustrates the principles of this invention. The open-top structure 14 shown in FIG. 1 could be used in a tarpaulin cover system for vehicle or agricultural use. Such a system in agricultural use would be able to protect raised plant beds from damaging weather conditions, for example.

As used herein, an upper perimeter section 16 is defined as the perimeter area of an open-top structure that extends from an uppermost level 17 of an open-top structure to a lower perimeter level 19 around at least three sides of the open-top structure 14. The upper perimeter section 16 can also be defined, in part, by a distance δ between the uppermost level 17 and the lower perimeter level 19.

Figure 3:
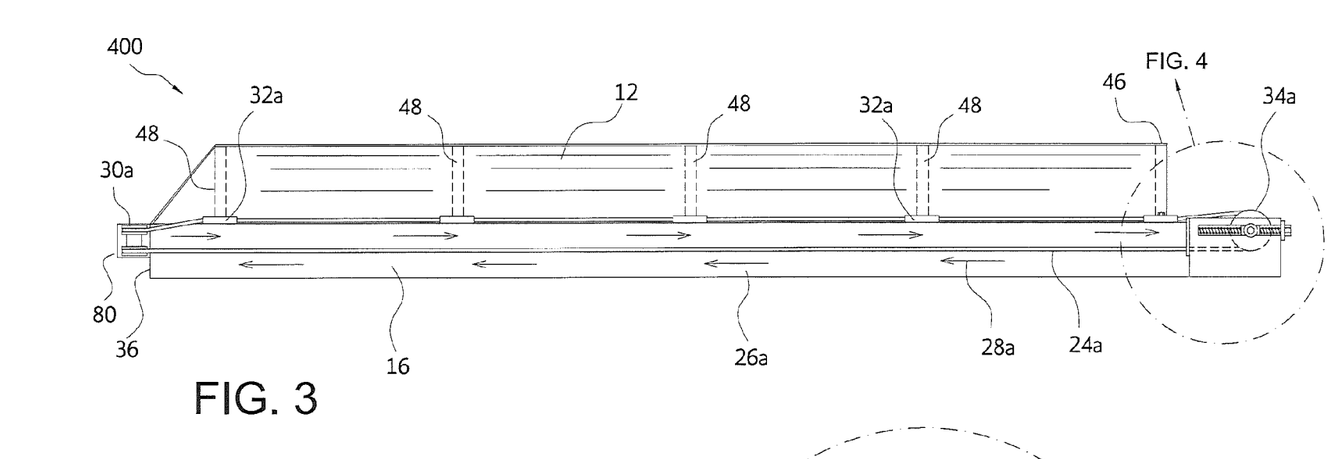
FIG. 3 is a right side view of the tarpaulin cover system of FIG. 2.

FIG. 2 shows a first configuration of a tarpaulin cover system 400. The system includes a drive unit 10 configured to initiate movement of a tarpaulin 12 from an initial position to a final position such that the tarpaulin 12 can substantially extend over open-top structure 14 (FIG. 1), 114 (FIGS. 6A-6B), 214 (FIG. 10). In some configurations, the tarpaulin cover system covers about eighty-five percent (85%) to about ninety-five percent (95%) of an open-top area defined by the upper perimeter section 16. FIG. 3 shows an example of tarpaulin cover system 400 with the tarpaulin 12 in a fully extended position, while FIGS. 6A-6D show the tarpaulin 12 in various positions along the length of the upper perimeter section 16.

Figure 4:
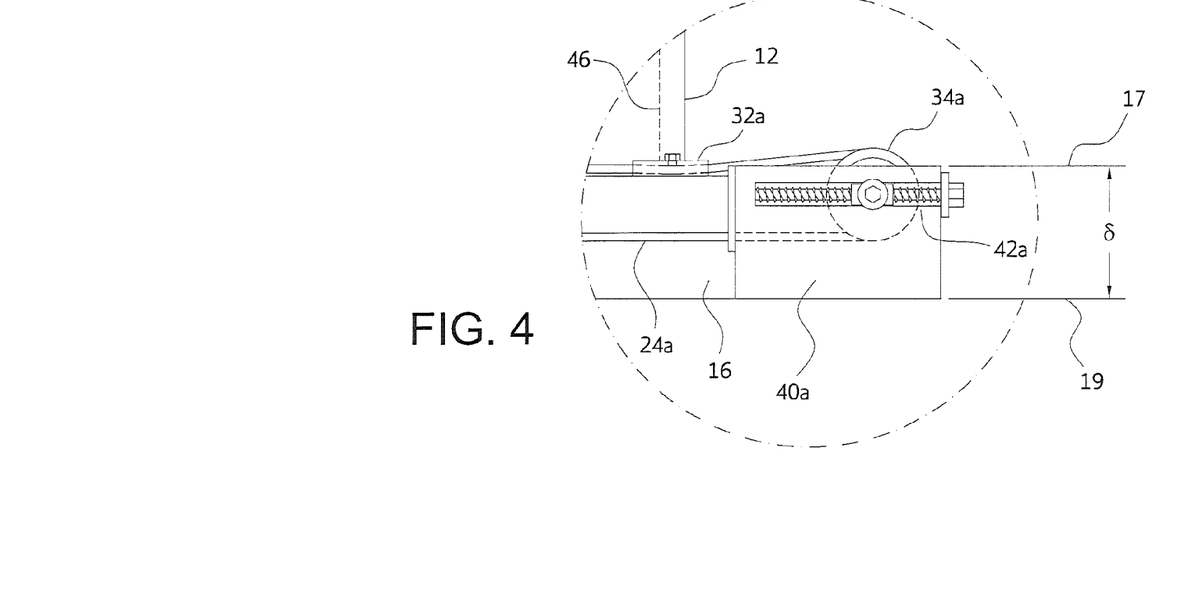
FIG. 4 is a detail view of a support pulley arrangement incorporated in the tarpaulin cover system shown in FIG. 3.

Referring particularly to FIGS. 2-4, the drive unit 10 is coupled to two cables 24a, 24b. A right-side cable 24a travels along a right-side path 26a indicated by arrows 28a. Similarly, a left-side cable 24b travels along a left-side path 26b, as indicated by arrows 28b. Moreover, along each path 26a, 26b, cables 24a, 24b travel through guide pulleys 30a, 30b, support-cable couplings 32a, 32b, and support pulleys 34a, 34b. The drive unit 10 is configured to move the cables 24a, 24b such that the system can extend and retract the tarpaulin 12 along a length of the upper perimeter section 16. The cables 24a, 24b are preferably endless cables that each have a predetermined length which depends, in part, on the placement or positioning of the drive unit on the open-top structure. Cables suitable for use in the drive units disclosed include those well-known in the art, particularly in tarpaulin cover systems used for vehicle bodies.

Guide pulleys 30a, 30b are preferably positioned near or adjacent to a face 36 of the upper perimeter section 16. Each support pulley 34a, 34b is preferably attached to a lateral face 38a, 38b of the upper perimeter section 16, using brackets 40a, 40b and fasteners 42a, 42b, or some other fastening arrangement. Support-cable couplings 32a, 32b preferably have a sleeve configuration (FIGS. 3 and 4) that allows sufficient clearance for cables 24a, 24b to travel through each coupling without significant interference.

Also included in the system 400 are a plurality of tarpaulin supports 44, including one drive support 46 and secondary supports 48 which extend between opposite sides of the tarpaulin 12. The plurality of tarpaulin supports 44 are defined at predetermined intervals. Each support also includes an arch that forms a bow-like shape. This type of upwardly extending bow-like shape allows the tarpaulin to be positioned over loaded materials that extend beyond the overall height of an open-top structure 14, 114, 214.

FIGS. 1, 6A-6D and 10 show one configuration of a drive unit 10 coupled to different types of open-top structures 14, 114, 214. However, any drive unit 10, 100, 200, 300 disclosed herein may be positioned over these and other types of open-top structures. The type of drive unit chosen depends upon many factors, including the cost of the overall tarpaulin cover system and the size and shape of the open-top structure. Moreover, each type of drive unit disclosed herein includes system elements positioned at least in part on an upper perimeter section 16, 116, 216 an open-top structure 14, 114, 214.

Figure 5A:
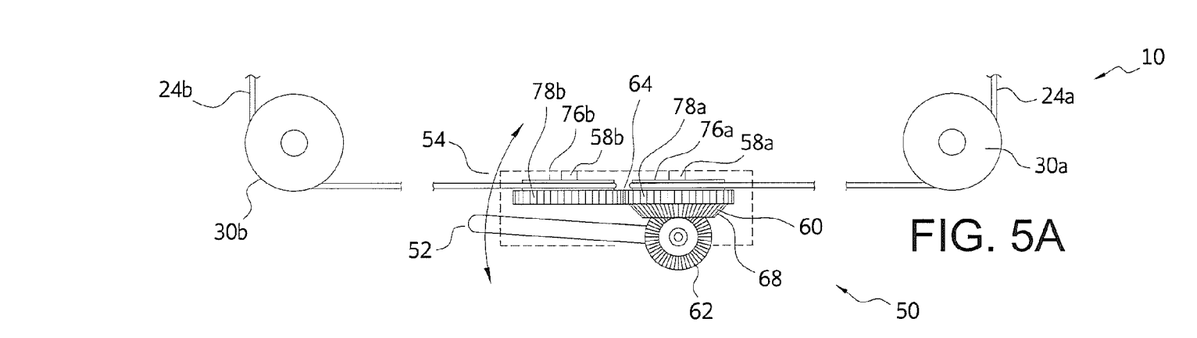
FIG. 5A is a top view of the drive unit shown in FIG. 1.
Figure 5B:
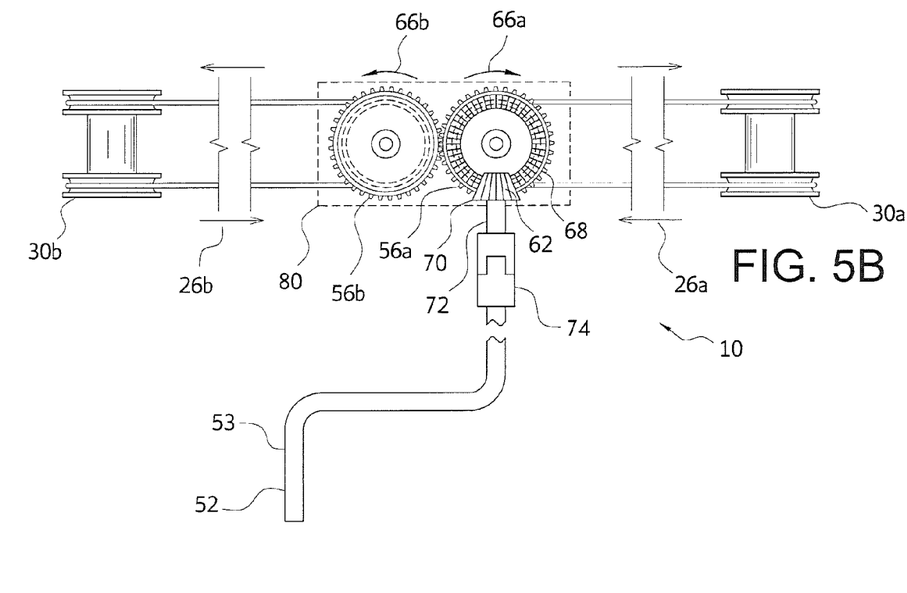
FIG. 5B is a front view of the drive unit configuration shown in FIG. 5A.
Figure 6A:
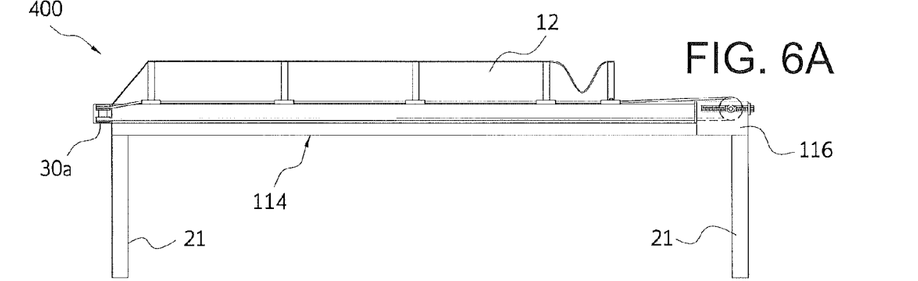
FIGS. 6A-6D are right side views of the tarpaulin cover system shown in Ms. 2-3, showing various positions of a tarpaulin during use of the tarpaulin cover system mounted on a stationary open-top structure.
Figure 6B:
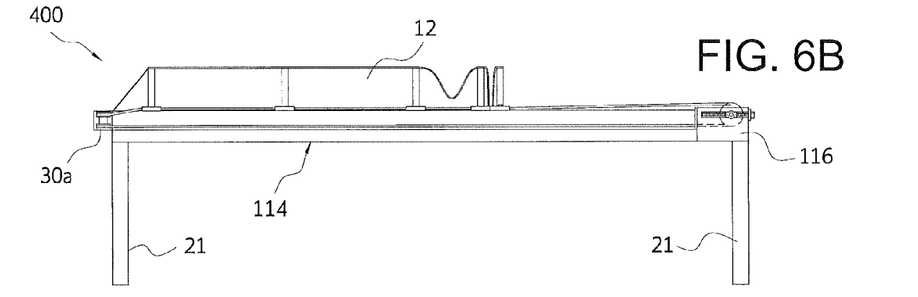
Figure 6C:
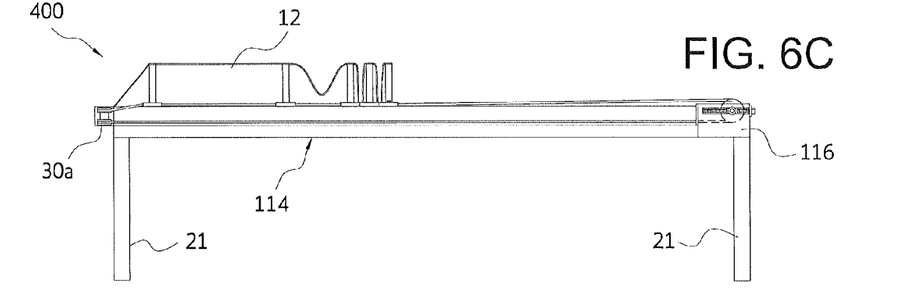
Figure 6D:
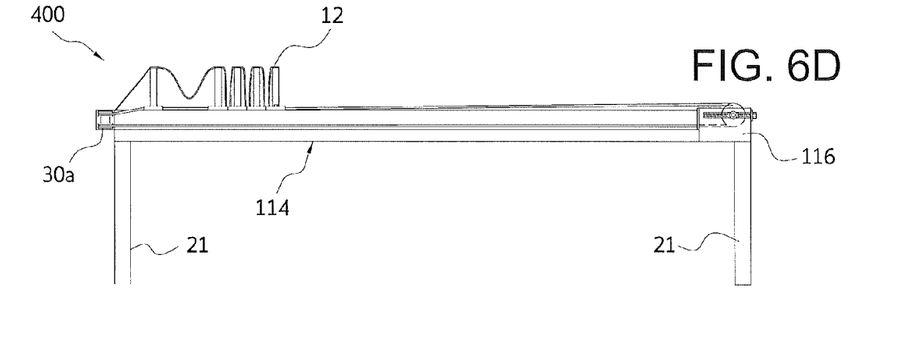

In a first configuration, shown particularly in FIGS. 5A and 5B, a drive unit 10 includes a gear arrangement 50 driven by a motion initiating device 52, such as a crank 53 which may be operated by hand. When a force is imparted to the motion initiating device, the gear arrangement 50 moves, as indicated by arrows 54. This movement initiates extension and retraction of the tarpaulin 12 (See FIGS. 6A-6D). The gear arrangement 50 also includes right and left spur gears 56a, 56b positioned on respective axles 58a, 58b, a first drive gear 60, and a second drive gear 62. The right and left spur gears 56a, 56b mesh at an interface 64 such that the gears rotate in opposite directions, as indicated by arrows 66a, 66b. Drive gears 60, 62 may be coupled to either the right and left spur gears 56a, 56b. FIGS. 5A and 5B, however, show a gear arrangement 50 with drive gears 60, 62 being coupled to the right spur gear 56a. This gear arrangement should not be construed as limiting. Depending on the arrangement, drive gear 60 may be integral with or attached to the left or right spur gear 56a, 56b.

The first drive gear 60 and the second drive gear 62 are preferably bevel gears, having tooth-bearing faces 68, 70 with a conical-shape. In a preferred arrangement, as shown in FIGS. 5A and 5B, the drive gears 60, 62 are respectively mounted on axles 58a, 72 about 90 degrees apart with respect to the central axes of the axles 58a, 72. The second drive gear axle 72 is also attached to the hand crank, using a coupling 74. Coupled to or integral with the gear arrangement 50 are right and left cable holders/pulleys 76a, 76b. In this drive unit configuration each holder is substantially flush against rearward faces 78a, 78b of the right and left spur gears 56a, 56b. Each holder also includes annular grooves of sufficient width and depth to grasp cables 24a, 24b as each cable travels along its respective path.

FIGS. 5A and 5B also show the relative positioning of guide pulleys 30a, 30b with respect to the drive unit 10.

Figure 7A:
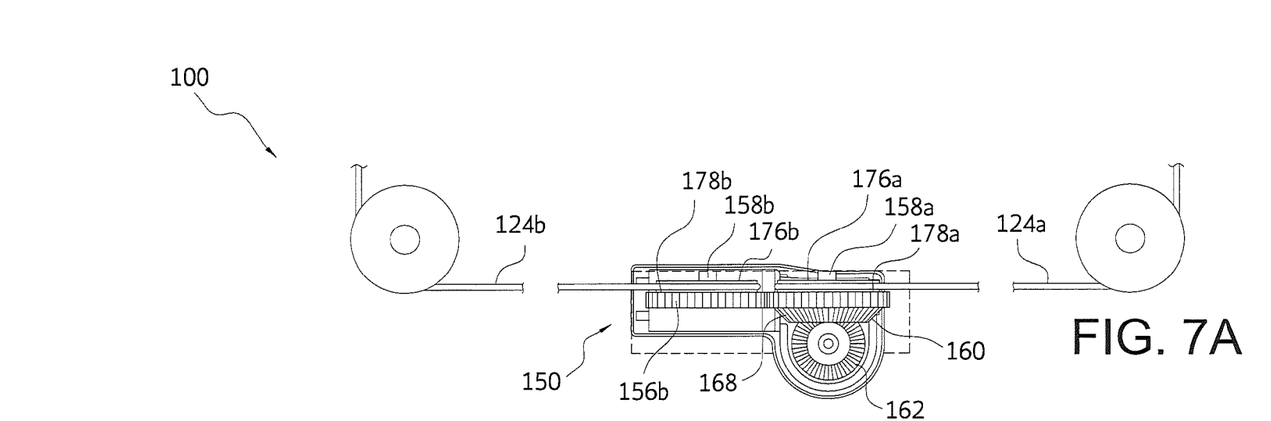
FIG. 7A is a top view of a second drive unit configuration.
Figure 7B:
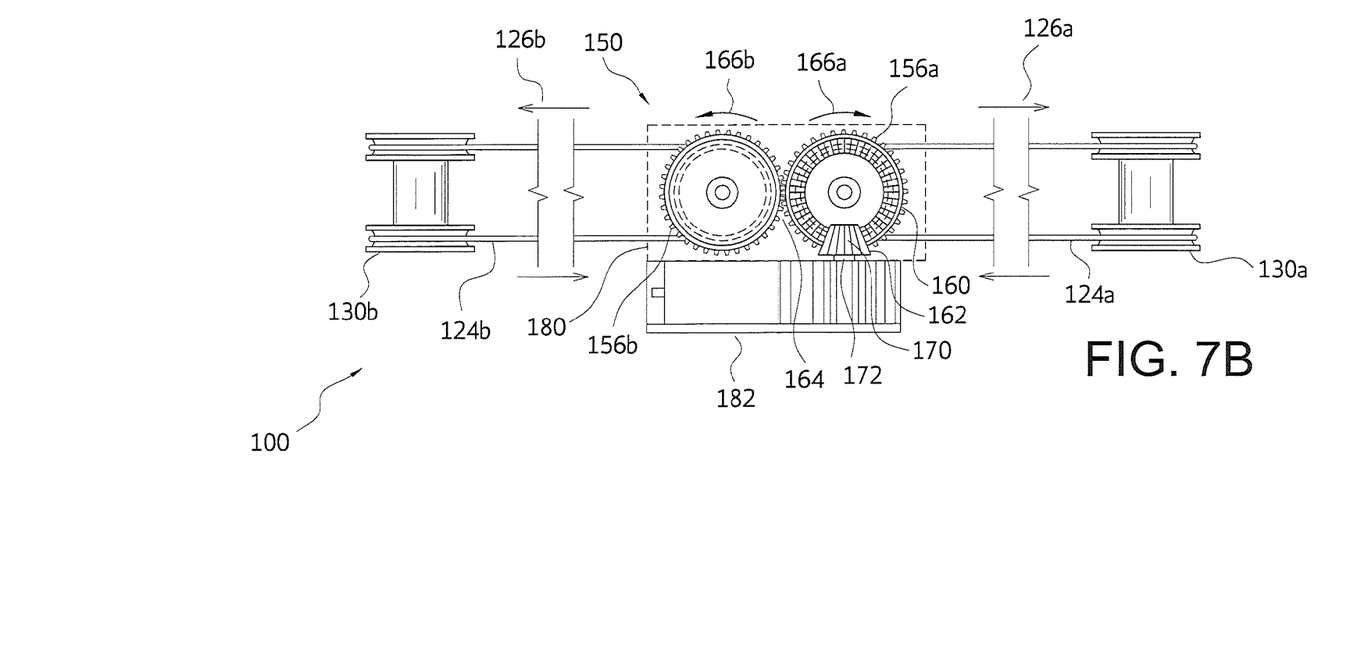
FIG. 7B is a front view of the drive unit shown in FIG. 7A.

In a second configuration, shown in FIGS. 7A and 7B, a drive unit 100 includes a gear arrangement 150 driven by a motor 182. The gear arrangement 150 includes right and left spur gears 156a, 156b positioned on respective axles 158a, 158b, a first drive gear 160, and a second drive gear 162. The right and left spur gears 156a, 156b mesh at an interface 164 such that the gears 56a, 56b rotate in opposite directions, as indicated by arrows 166a, 166b. Drive gears 160, 162 may be coupled to either the right and left spur gears 156a, 156b. FIGS. 7A and 7B, however, show a gear arrangement 150 with drive gears 162, 164 being coupled to the right spur gear 156a. This gear arrangement also should not be construed as limiting.

In this configuration, the first drive gear 160 and the second drive gear 162 are also bevel gears with tooth-bearing faces 168, 170 having a conical-shape. The drive gears 162, 164 are mounted on axles 158a, 172 about 90 degrees apart with respect to a substantially vertical and horizontal central axes of axles 158a, 172. But in this configuration, the second drive gear axle 172 is attached to a motor 182. Coupled to or integral with the gear arrangement 150 are right and left cable holders/pulleys 176a, 176b, which are substantially flush against rearward faces 178a, 178b of the right and left spur gears 156a, 156b. The holders and pulleys include annular grooves of sufficient width and depth to hold cables 124a, 124b as each cable travels along its respective path 126a, 126b.

In a third configuration, shown in FIGS. 8A and 8B, a drive unit 200 includes a gear arrangement 250 also driven by a motor 282. The gear arrangement 250 includes a primary right spur gear 256*a*, a left spur gear 256*b*, and a secondary right spur gear 256*c* that couples to a motor 282 via axis 284. The primary right spur gear 256*a* and the left spur gear 256*b* are positioned on respective axles 258*a*, 258*b*. The primary right spur gear 256*a* and the left spur gear 256*b* mesh at an interface 264 such that the gears 256*a*, 256*b* rotate in opposite directions, as indicated by arrows 266*a*, 266*b*. However, the secondary right spur gear 256*c* meshes with the primary right spur gear at a second interface 286 such that the gears 256*b*, 256*c* rotate in the same direction.

Coupled to or integral with the gear arrangement 250 are right and left cable holders/pulleys 276*a*, 276*b*, which are substantially flush against rearward faces 278*a*, 278*b* of the right and left spur gears 256*a*, 256*b*. The holders include annular grooves of sufficient width and depth to hold cables 224*a*, 224*b* as each cable travels along its respective path 226*a*, 226*b*.

In a fourth configuration, shown in FIGS. 9A and 9B, a drive unit 300 includes a gear arrangement 350 driven by a motor 382. The gear arrangement 350 includes a right spur gear 356*a* and a left spur gear 356*b* that mesh at an interface 364, and a secondary left spur gear 356*c* that couples to the motor 382 via axis 258*a*. The right spur gear 356*a* and the primary left spur gear 356*b* are positioned on respective axles 358*a*, 358*b*. The right spur gear 356*a* and the primary left spur gears 356*b* mesh at the interface 364 such that the gears 356*a*, 356*b* rotate in opposite directions, as indicated by arrows 366*a*, 366*b*. Coupled to or integral with the gear arrangement 350 are right and left cable holders/pulleys 376*a*, 376*b*, which are substantially flush against rearward faces 378*a*, 378*b* of the right and left spur gears 356*a*, 356*b*. The holders and pulleys include annular grooves of sufficient width and depth to hold cables 324*a*, 324*b* as each cable travels along its respective path 326*a*, 326*b*.

Motors 182, 282, 382 in drive units 100, 200, 200 may be driven by alternating current (AC) or direct current (DC), depending upon overall needs of the tarpaulin cover system. The motor also may be coupled to one or more controls (not shown) which initiate retraction and extension of the tarpaulin. For example, a motor may be controlled by a remote unit, having system controls (not shown) integrated with the drive unit. These system controls may include one or more switches that automatically provide for forward/reverse movement of tarpaulin or which turn the system off or on.

Optionally, a housing 80, 180, 280, 380, shown particularly in FIGS. 5B, 7B, 8B, and 9B is positioned at least partially over a gear arrangement 50, 150, 250, 350. Preferably, the housing is manufactured from one or more corrosion resistant materials that protect the gear arrangement from moisture, dirt and debris. Suitable materials include, but are not limited to, steels, composites, plastics, aluminum, etc.

Thus, various configurations of drive units for tarpaulin cover systems are disclosed. While embodiments of this inventions disclosed herein have been shown and described, it will be apparent to those skilled in the art that many more modifications are possible without departing from the inventive concepts herein. The invention, therefore, is not to be restricted except in the spirit of the following claims.

What is claimed is:

1. A drive unit for a tarpaulin cover system, comprising a gear arrangement configured to attach to an upper perimeter section of an open top structure, the gear arrangement including a left spur gear attached to a left cable holder/pulley for a left cable mounted to a tarpaulin cover, a right spur gear attached to a right cable holder/pulley for a right cable mounted to the tarpaulin cover, the left spur gear and the right spur gear being mounted on parallel axles and intermeshing with each other, a first bevel drive gear mounted coaxially to one of the spur gears for rotating that spur gear, a second bevel drive gear mounted to an axle perpendicular to the axle of the first bevel gear, the second bevel gear intermeshing with the first bevel gear, and a motion initiating device coupled to the gear arrangement and configured to impart a force that initiates rotation of the bevel drive gears and the spur gears to rotate the spur gears in opposite directions for simultaneously moving the left and right cables to thereby move the tarpaulin cover.

2. The drive unit of claim 1, wherein the first bevel drive gear is integral with its coaxially mounted spur gear.

3. The drive unit of claim 1, wherein the first bevel drive gear is separate from and attached to its coaxially mounted spur gear.

4. The drive unit of claim 1, wherein the second bevel gear meshes solely with the first bevel gear.

5. The drive unit of claim 1, wherein the motion initiating device comprises a motor or a crank.

6. A tarpaulin cover system comprising, in combination, an open-top structure having an upper perimeter section and separate left and right cables and a tarpaulin cover, and a drive unit comprising a gear arrangement being attached to the upper perimeter section, the gear arrangement including a left spur gear attached to a left cable holder/pulley for the left cable mounted to the tarpaulin cover, a right spur gear attached to a right cable holder/pulley for the right cable mounted to the tarpaulin cover, the left spur gear and the right spur gear mounted on parallel axels and intermeshing with each other, a first bevel drive gear mounted coaxially to one of the spur gears for rotating that spur gear, a second bevel drive gear mounted to an axle perpendicular to the axle of the first bevel gear, the second bevel gear intermeshing with the first bevel gear, and a motion initiating device coupled to the gear arrangement and configured to impart a force that initiates rotation of the bevel drive gears and the spur gears to rotate the spur gears in opposite directions for simultaneously moving the left and right cables to thereby move the tarpaulin cover.

7. The system of claim 6, wherein the open top structure includes parallel side walls and at least one interconnecting end wall, the cables moving the tarpaulin cover along the side walls, and the gear arrangement being located at the end wall.

8. The system of claim 7, wherein a housing is positioned over the gear arrangement.

9. The system of claim 6, wherein the open-top structure includes a plurality of legs.

10. The system of claim 6, wherein the open-top structure is a vehicle body.

11. A drive unit for a tarpaulin cover system, comprising a gear arrangement configured to attach to an upper perimeter section of an open top structure, the gear arrangement including a left spur gear attached to a left cable holder/pulley for a left cable mounted to a tarpaulin cover, a right spur gear attached to a right cable holder/pulley for a right cable mounted to the tarpaulin cover, the left spur gear and the right spur gear being mounted on parallel axles and intermeshing with each other, a secondary spur gear intermeshing with one of the left spur gear and the right spur gear and rotatable in the opposite direction as that spur gear, and a motion initiating device coupled to the secondary spur gear and configured to impart a force that initiates rotation of the secondary spur gear and the left spur gear and the right spur gear to rotate the left and right spur gears in opposite directions for simultaneously moving the left and right cables to thereby move the tarpaulin cover.

12. The drive unit of claim 11, wherein the motion initiating device is a motor.

13. The drive unit of claim 11, wherein the motor rotates on an axle on which the secondary spur gear is mounted.

14. A tarpaulin cover system comprising, in combination, an open-top structure having an upper perimeter section and separate left and right cables and a tarpaulin cover, and a drive unit comprising a gear arrangement attached to the upper perimeter section, the gear arrangement including a left spur gear attached to the left cable holder/pulley for the left cable mounted to the tarpaulin cover, a right spur gear attached to a right cable holder/pulley for the right cable mounted to the tarpaulin cover, the left spur gear and the right spur gear being mounted on parallel axles and intermeshing with each other, a secondary spur gear intermeshing with one of the left spur gear and the right spur gear and rotatable in the opposite direction as the spur gear, and a motion initiating device coupled to the secondary spur gear and configured to impart a force that initiates rotation of the secondary spur gear and the left spur gear and the right spur gear to rotate the left and right spur gears in opposite directions for simultaneously moving the left and right cables to thereby move the tarpaulin cover.

15. The system of claim 14, wherein the open top structure includes parallel side walls and at least one interconnecting end wall, the cables moving the tarpaulin cover along the side walls, and the gear arrangement being located at the end wall.

16. The system of claim 15, wherein a housing is positioned over the gear arrangement.

17. The system of claim 14, wherein the open-top structure includes a plurality of legs.

18. The system of claim 14, wherein the open-top structure is a vehicle body.

* * * * *